US012528549B2

(12) United States Patent
Thompson et al.

(10) Patent No.: US 12,528,549 B2
(45) Date of Patent: Jan. 20, 2026

(54) CENTRALIZER FOR AN EXTENDABLE TRAILER

(71) Applicant: White's Welding, LLC, Woodward, OK (US)

(72) Inventors: Russell Thompson, Woodward, OK (US); Alexander L. Marks, Edmond, OK (US)

(73) Assignee: White's Welding, LLC, Woodward, OK (US)

( * ) Notice: Subject to any disclaimer, the term of this patent is extended or adjusted under 35 U.S.C. 154(b) by 902 days.

(21) Appl. No.: 17/732,973

(22) Filed: Apr. 29, 2022

(65) Prior Publication Data

US 2023/0347996 A1 Nov. 2, 2023

(51) Int. Cl.
*B62D 53/06* (2006.01)
*B62D 21/14* (2006.01)
*B62D 21/20* (2006.01)

(52) U.S. Cl.
CPC ........... *B62D 53/067* (2013.01); *B62D 21/14* (2013.01); *B62D 21/20* (2013.01)

(58) Field of Classification Search
CPC ...... B62D 53/067; B62D 21/14; B62D 21/20; B62D 63/061
See application file for complete search history.

(56) References Cited

U.S. PATENT DOCUMENTS

| 4,232,990 | A | * | 11/1980 | Pierce | B60P 3/1083 |
| | | | | | 414/559 |
| 4,623,161 | A | * | 11/1986 | Sprague | B60P 3/1075 |
| | | | | | 114/344 |
| 4,746,142 | A | * | 5/1988 | Davis | B62D 63/061 |
| | | | | | 280/37 |
| 4,793,625 | A | * | 12/1988 | Gerber | B60P 3/1033 |
| | | | | | 280/414.1 |
| 7,726,680 | B2 | * | 6/2010 | Lane | B60P 3/1083 |
| | | | | | 280/491.2 |
| 10,543,875 | B2 | * | 1/2020 | Morena | B62D 65/00 |

(Continued)

*Primary Examiner* — Valentin Neacsu
*Assistant Examiner* — Marlon A Arce
(74) *Attorney, Agent, or Firm* — Hall Estill Law Firm

(57) ABSTRACT

An extendable trailer including a nose end for selectively securing the extendable trailer to a vehicle wherein the nose end includes an extendable frame portion. The extendable trailer also includes a tail end having a primary frame to support objects to be transported on the extendable trailer and a central tube member supported by the primary frame. The central tube member includes an inside portion. The extendable trailer further includes a telescopic tube member of the nose end that slidably engages the central tube member. The extendable trailer also includes a centralizer disposed on an insertion end of the telescopic tube member that engages with the inside portion of the central tube member to help centrally position the telescopic tube member in the central tube member when the telescopic tube member is extended into and out of the central tube member. A method of transporting objects using the extendable trailer. The method includes determining a desired length of the extendable trailer and positioning the telescopic tube member relative to the central tube member to achieve the desired length. The method also includes transporting objects on the extendable trailer.

18 Claims, 5 Drawing Sheets

(56) References Cited

U.S. PATENT DOCUMENTS

| | | | |
|---|---|---|---|
| 12,246,783 B2* | 3/2025 | Poole | B62D 53/067 |
| 2004/0075242 A1* | 4/2004 | Richards | B60D 1/40 |
| | | | 280/491.2 |
| 2005/0057059 A1* | 3/2005 | Green | B62D 63/061 |
| | | | 296/26.09 |
| 2007/0278766 A1* | 12/2007 | Schneider | B62D 63/062 |
| | | | 280/400 |
| 2011/0187084 A1* | 8/2011 | Walters, Jr. | B62D 61/00 |
| | | | 280/656 |
| 2015/0084314 A1* | 3/2015 | Ingels | B62D 21/14 |
| | | | 280/789 |
| 2018/0170458 A1* | 6/2018 | Morena | B62D 21/20 |

* cited by examiner

CENTRALIZER FOR AN EXTENDABLE TRAILER

STATEMENT REGARDING FEDERALLY SPONSORED RESEARCH OR DEVELOPMENT

Not applicable.

CROSS-REFERENCE TO RELATED APPLICATIONS

Not Applicable.

BACKGROUND OF THE DISCLOSURE

1. Field of the Invention

The present disclosure relates to a centralizer for an extendable trailer for providing stability and improved operability of the extendable trailer.

2. Description of the Related Art

Extendable trailers are extremely useful for hauling various length objects, such as electric line poles. When and extendable trailer is expanded and retracted, components of the trailer can become damaged due to the mass of various components and the force it can take to extend and retract the extendable trailer.

Accordingly, there is a need for a device that can be implemented on certain parts of extendable trailers that increases the operability, extends the lifetime, and reduces damage to an extendable trailer.

SUMMARY OF THE DISCLOSURE

The present disclosure is directed to an extendable trailer. The extendable trailer includes a nose end for selectively securing the extendable trailer to a vehicle wherein the nose end includes an extendable frame portion. The extendable trailer also includes a tail end having a primary frame to support objects to be transported on the extendable trailer and a central tube member supported by the primary frame. The central tube member includes an inside portion. The extendable trailer further includes a telescopic tube member of the nose end that slidably engages the central tube member. The extendable trailer also includes a centralizer disposed on an insertion end of the telescopic tube member that engages with the inside portion of the central tube member to help centrally position the telescopic tube member in the central tube member when the telescopic tube member is extended into and out of the central tube member.

The present disclosure is directed to a method of transporting objects using the extendable trailer. The method includes determining a desired length of the extendable trailer and positioning the telescopic tube member relative to the central tube member to achieve the desired length. The method also includes transporting objects on the extendable trailer.

DETAILED DESCRIPTION OF THE DISCLOSURE

Figure 1A:
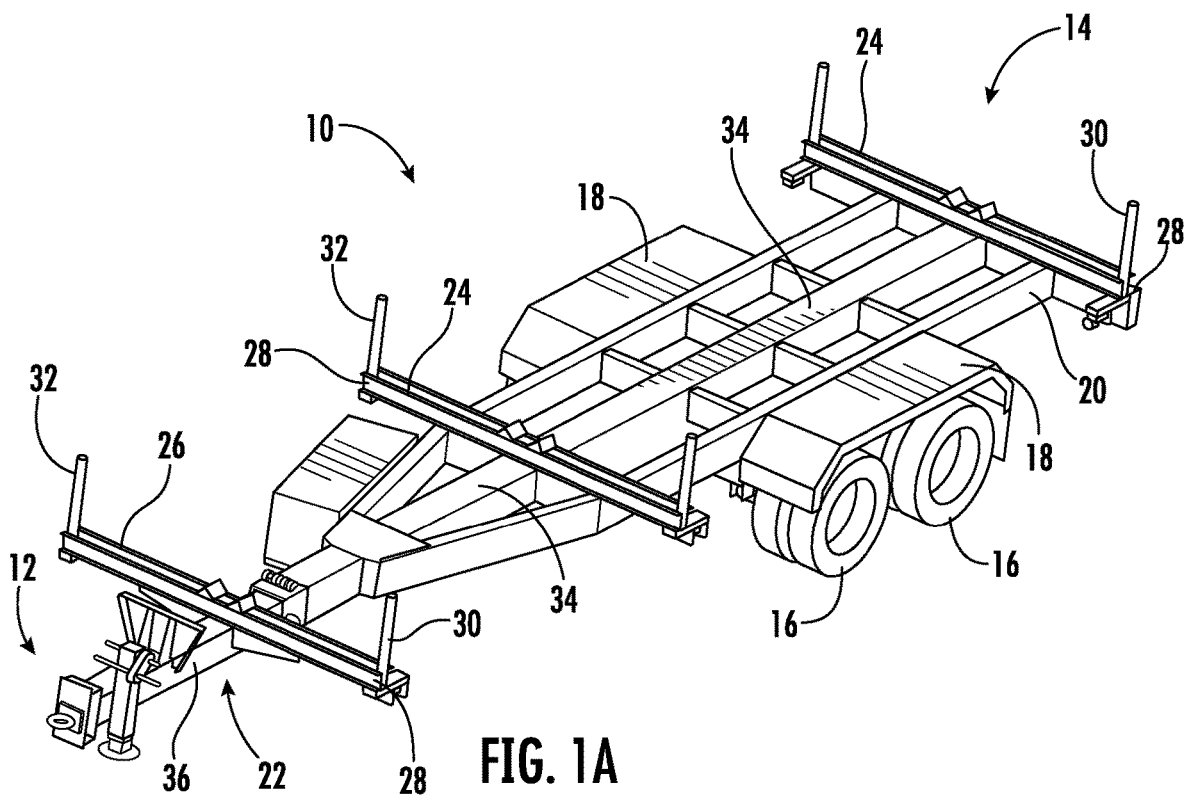
FIG. 1A is a perspective view of an extendable trailer in a first position constructed in accordance with the present disclosure.
Figure 1B:
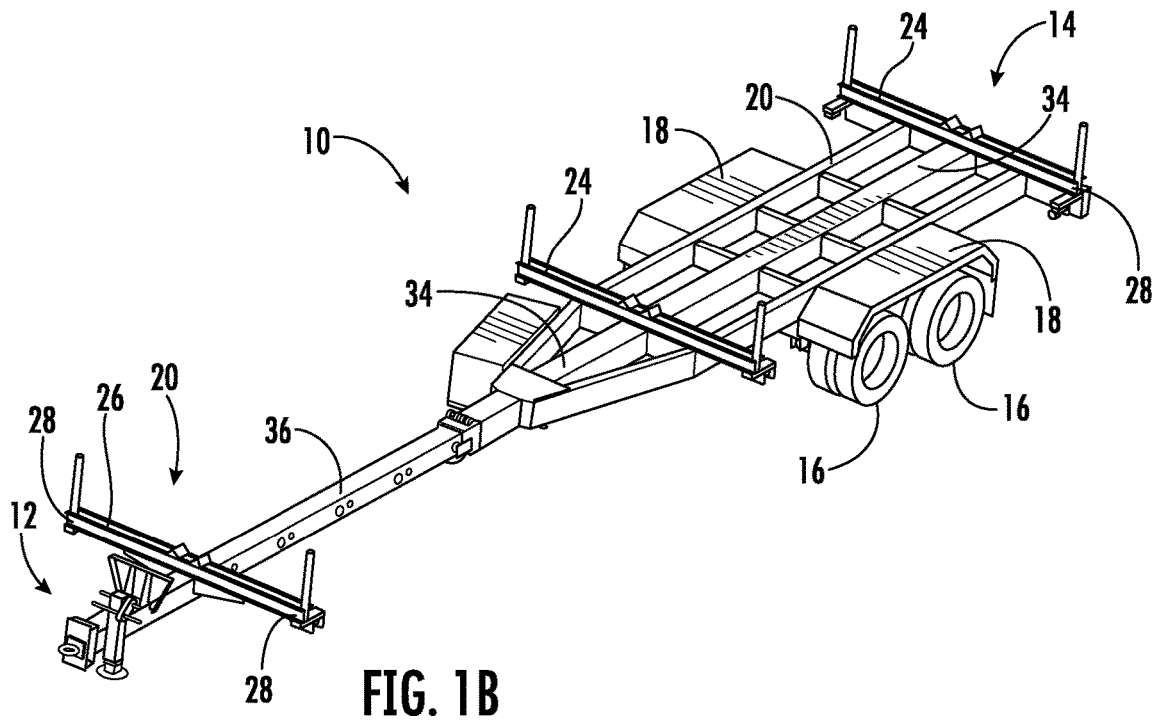
FIG. 1B is a perspective view of the extendable trailer in a second position constructed in accordance with the present disclosure.
Figure 1C:
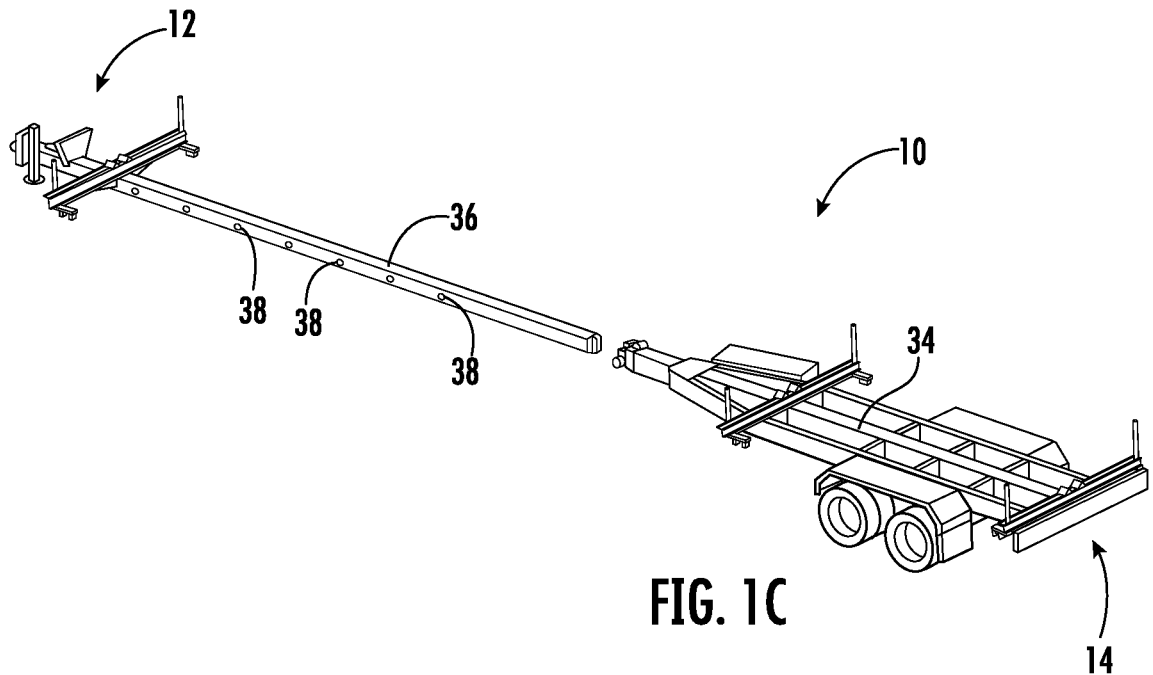
FIG. 1C is an exploded view of the extendable trailer constructed in accordance with the present disclosure.
Figure 2A:
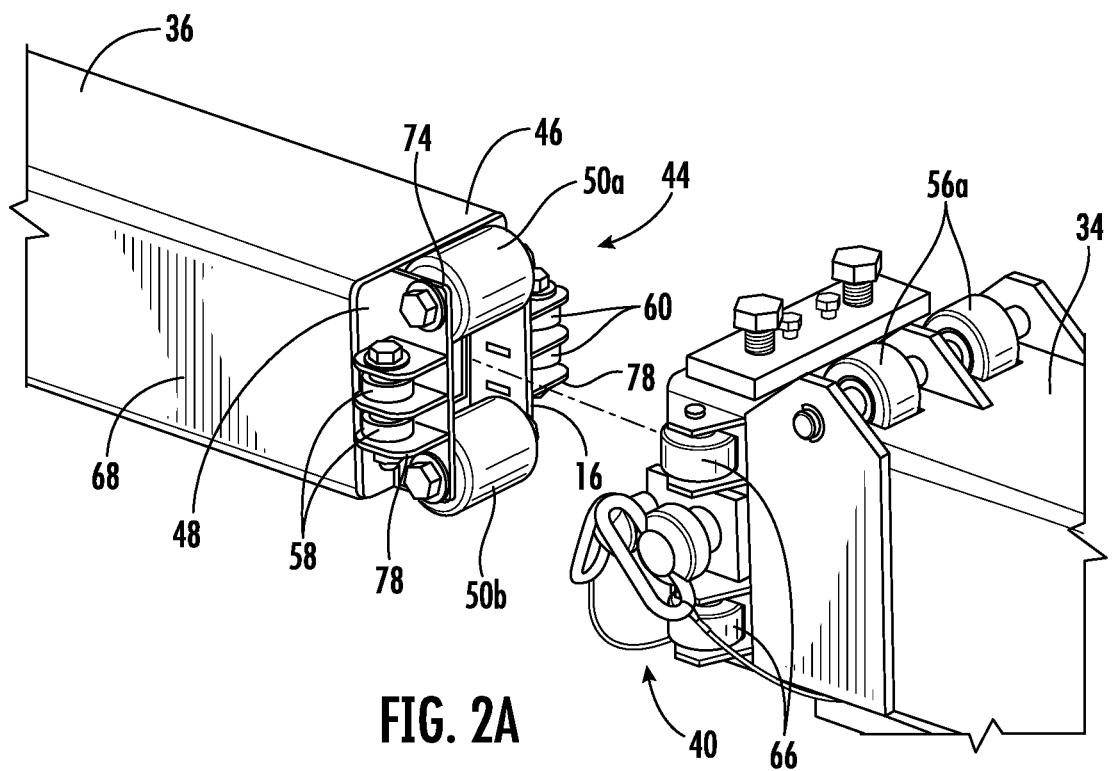
FIG. 2A is a perspective view of a portion of the extendable trailer constructed in accordance with the present disclosure.
Figure 2B:
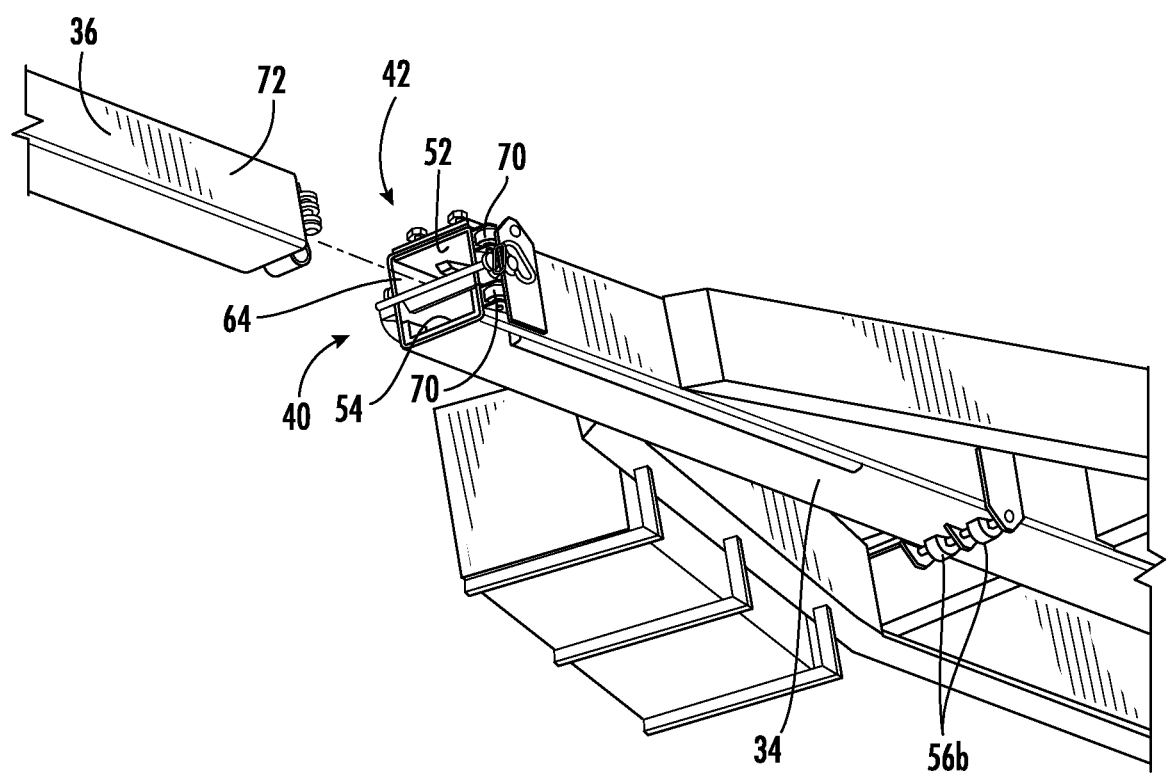
FIG. 2B is another perspective view the portion of the extendable trailer shown in FIG. 2A constructed in accordance with the present disclosure.
Figure 3A:
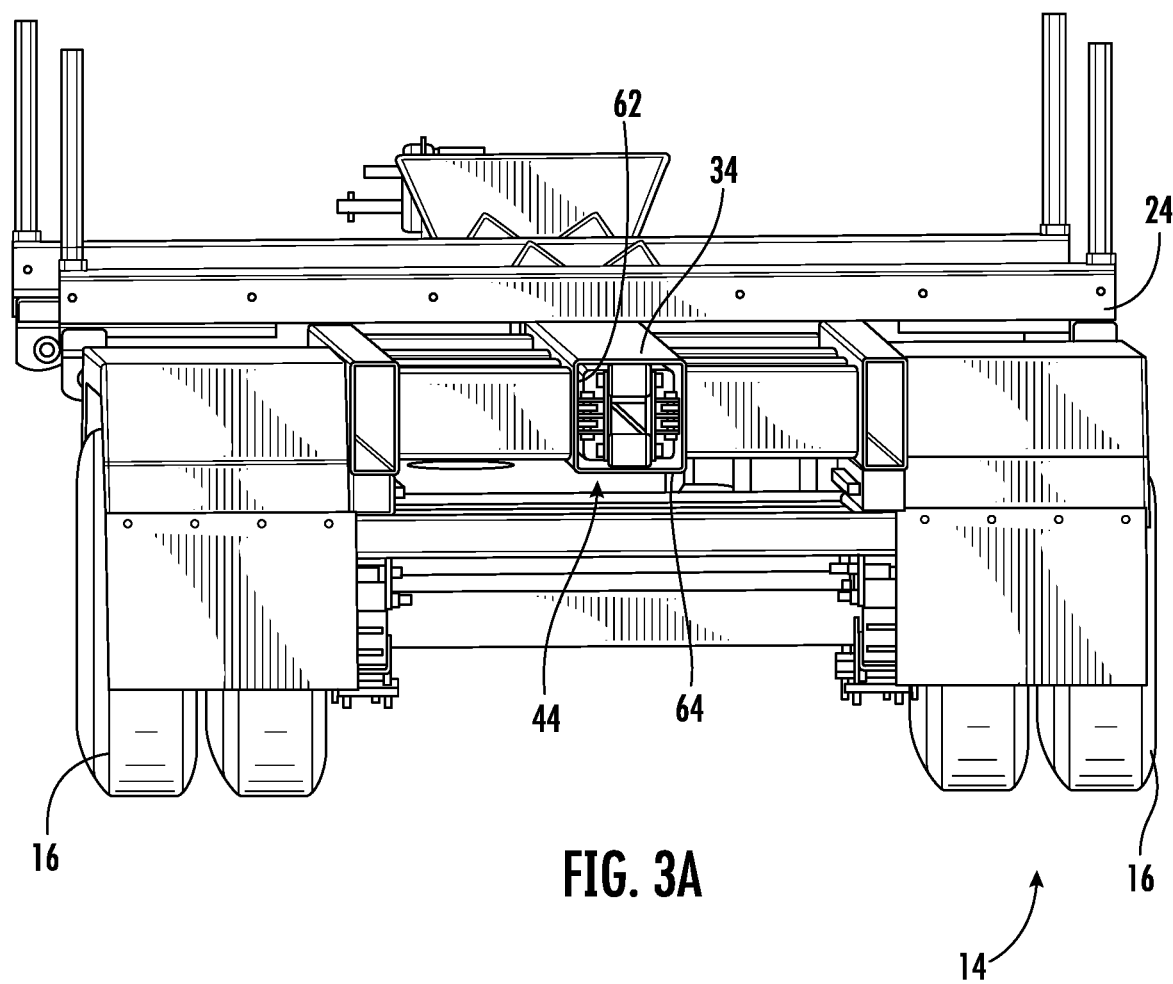
FIGS. 3A-3B are perspective views of the portion of the extendable trailer constructed in accordance with the present disclosure.
Figure 3B:
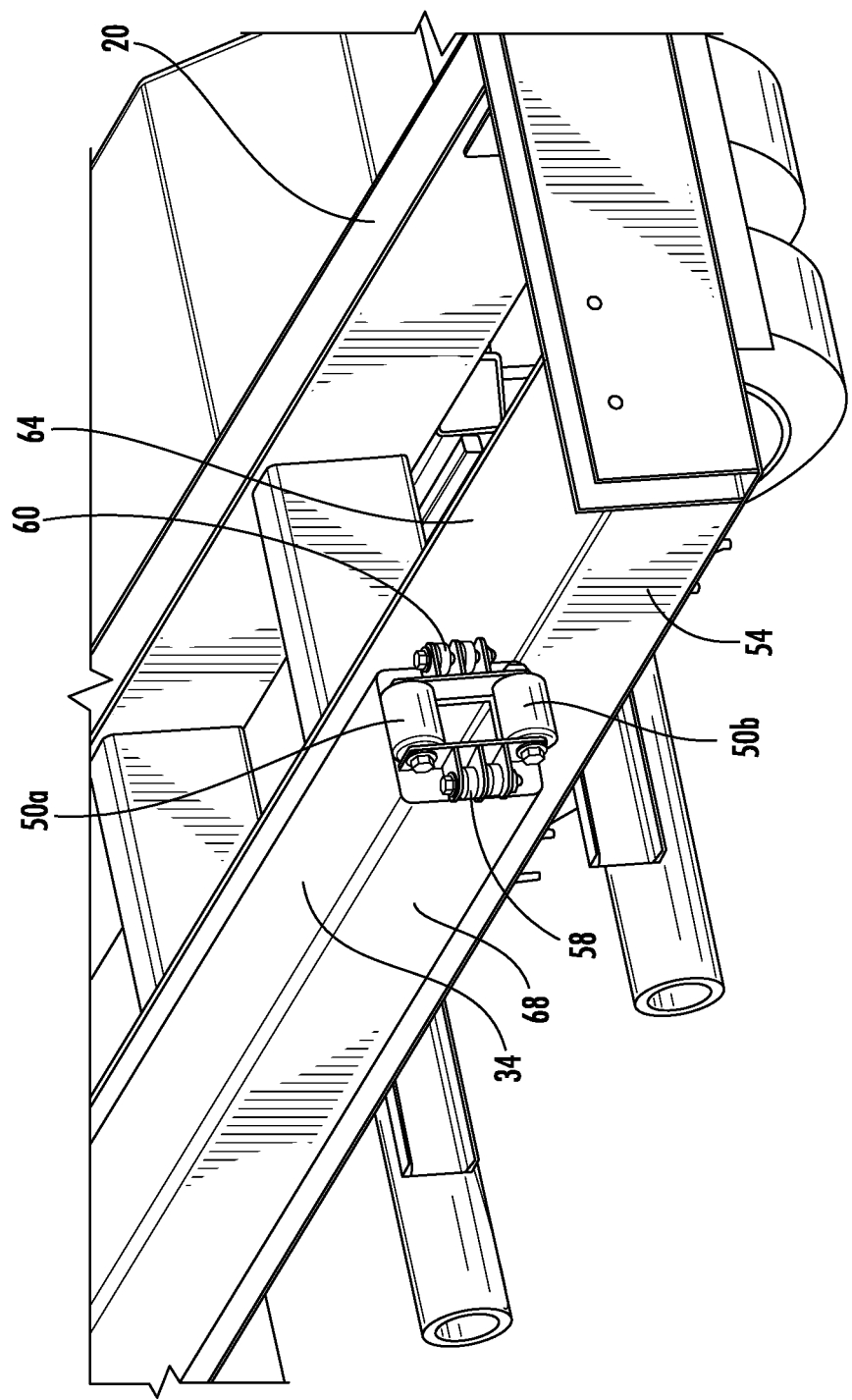

Referring now to FIGS. 1A-1C, shown therein is an extendable trailer 10 with improved reliability and longevity. The extendable trailer 10 includes a nose end 12 for attachment to a vehicle and a tail end 14. The nose end 12 includes any and all the components typically associated with the nose end 12 of a trailer. The extendable trailer 10 can also include wheels 16, axles (not shown), fenders 18 and other known trailer components. Further, the extendable trailer 10 includes a primary frame 20 that is supported by the axles of the extendable trailer 10 and an extendable frame portion 22 that has a telescoping relationship with the primary frame 20. The primary frame 20 can support lateral support beams 24 that will support the long objects that are transported in a direction generally parallel to the length of the trailer. The extendable frame portion 22 can also include a front lateral support beam 26 to cooperate with the lateral support beams 24 disposed on the primary frame 20 to support and transport long and extra-long objects. The ends 28 of the lateral support beams 24 and 26 can include a first vertical support post 30 on one end and a second vertical support post 32 on the other end. The vertical support posts 30 and 32 cooperate to prevent the long and extra-long objects from falling off the side of the extendable trailer 10.

The frame 20 can be comprised of any number of structural components for providing the desired strength and hauling capabilities of the extendable trailer 10. In one embodiment of the present disclosure, the frame 20 can include a central tube member 34 that can receive a telescopic tube member 36 of the extendable frame portion 22. The telescopic tube member 36 can be slidably disposed within the central tube member 34 to be able to have the extendable trailer 10 be a desired length. The telescopic tube member 36 can is selectively securable to the central tube member 34 via any manner known in the art, such as holes 38 in the telescopic tube member 36 and a linch pin device 40 disposed on an open end 42 of the central tube member 34.

Now referring to FIGS. 2A-3B, shown therein is the telescopic tube member 36 with a centralizer 44 disposed on an insertion end 46 of the telescopic tube member 36. The insertion end 46 is opposite side of the telescopic tube member 36 of the nose end 12 of the telescopic tube member 36. The centralizer 44 engages the inside of the central tube member 34 to prevent the insertion end of the telescopic tube member 36 from impacting or aggressively engaging the inside of the central tube member 34 and causing damage to the extendable trailer 10. This becomes more of an issue the further the telescopic tube member 36 is extended out of the central tube member 34.

In one embodiment, the centralizer 44 can be secured directly to the insertion end 46 of the telescopic tube member 36. In another embodiment, the centralizer 44 can be secured to a plate 48 that is secured to the insertion end 46 of the telescopic tube member 36. The centralizer 44 can include rollers 50 for engaging the inside of the central tube member 34 to maintain a centralized position of the telescopic tube member 36 in the central tube member 34 when the telescopic tube member 36 is extended and retracted from the central tube member 34.

In one embodiment of the present disclosure, the centralizer 44 can include an upper roller 50a to engage an upper inside surface 52 of the central tube member 34 and a lower roller 50b to engage a lower inside surface 54 of the central tube member 34. The engagement of the upper roller 50a and the lower roller 50b with the inside surfaces 52 and 54 of the central tube member 34 prevents the insertion end 46 of the telescopic tube member 36 from becoming damaged from contacting the inner surfaces 52 and 54 of the central tube member 34. The open end 42 of the central tube member 34 can also include upper wheels 56a and lower wheels 56b. The centralizer 44 and the upper and lower wheels of the open end 42 of the central tube member 34 cause the telescopic tube member 36 to slide in and out of the central tube member 34 much easier which can extend the life of the extendable trailer 10 and reduce damage to the telescopic tube member 36 and the central tube member 34.

In a further embodiment of the present disclosure, the centralizer 44 can include a first side roller 58 to engage a first inner sidewall surface 62 of the central tube member 34 and a second side roller 60 to engage a second inner sidewall surface 64 of the central tube member 34. Similar to the upper and lower rollers 50a and 50b, the engagement of the first side roller 58 and the second side roller 60 with the inner sidewall surfaces 62 and 64 of the central tube member 34 prevents the insertion end 46 of the telescopic tube member 36 from becoming damaged from contacting the inner sidewall surfaces 62 and 64 of the central tube member 34. In yet another embodiment, the open end 42 of the central tube member 34 can have a first side wheel 66 disposed therein to engage a first side 68 of the telescopic tube member 36 and a second side wheel 70 to engage a second side 72 of the telescopic tube member 36. Similar to the upper and lower wheels 50a and 50b engaging with the central tube member 34, the centralizer 44 and the side wheels 66 and 70 of the open end 42 of the central tube member 34 cause the telescopic tube member 36 to slide in and out of the central tube member 34 much easier which can extend the life of the extendable trailer 10 and reduce damage to the telescopic tube member 36 and the central tube member 34.

The rollers 50a, 50b, 58 and 60 can be more than one roller if desired or more than one roller if desired. If more than one roller is used for a particular side, they can be spaced such that their placement does not interfere with any other workings of the extendable trailer 10, such as holes in the open end 42 for the linch pin device 40 to engage. Similarly, the wheels 56a, 56b, 66 and 70 of the open end 42 of the central tube member 34 can be one or more wheels depending upon the desired design. If more than one wheel is used for a particular side, the wheels can be spaced such that the wheels of one side (e.g. the upper side) does not interfere with the upper roller(s) 50a. Also, the wheels should not interfere with the operation of the extendable trailer 10. For example, the wheels can be placed such that they do not engage with the lateral holes 38 disposed in the telescopic tube member 36. It should be understood that all the wheels and rollers of the extendable trailer 10 can be placed wherein none of them interfere or contact the others.

The centralizer 44 can include a first flange 74 and a second flange 76 extending from the plate 48 that can support the upper and lower rollers 50a and 50b and permit the upper and lower rollers 50a and 50b to rotate as operationally desired. The rollers 50a and 50b can extend between the flanges 72 and 74 in one embodiment. The centralizer 44 can also include lateral plate elements 78 that can extend from the first flange 74 or the second flange 76 that support the first and second side rollers 58 and 60. The side rollers 58 and 60 can extend between adjacent lateral plate elements 78.

The open end 42 of the central tube member 34 can include lateral flanges 80 that extend from the sides to support the side wheels 66 and 70. The sides of the open end 42 of the central tube member 34 can include openings 82 disposed therein to permit the wheels 66 and 70 to extend therethrough and engage the sides 68 and 70 of the telescopic tube member 36, respectively.

The present disclosure is also directed toward a method of hauling objects with the extendable trailer 10 disclosed herein. The method can include sliding the telescopic tube member 36 in and out of the central tube member 34 to establish a desired length of the extendable trailer 10. The telescopic tube member 36 can then be secured relative to the central tube member 34.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. An extendable trailer, the extendable trailer comprising:
    a nose end for selectively securing the extendable trailer to a vehicle, the nose end having an extendable frame portion;
    a tail end having a primary frame to support objects to be transported on the extendable trailer;
    a central tube member supported by the primary frame, the central tube member having an inside portion, the central tube member includes an open end that receives the insertion end of the telescopic tube member, the open end of the central tube member can include at least one wheel disposed in a first lateral opening in a first sidewall of the central tube member to engage a first outer sidewall of the telescopic tube member;
    a telescopic tube member of the nose end that slidably engages the central tube member; and
    a centralizer disposed on an insertion end of the telescopic tube member that engages with the inside portion of the central tube member to help centrally position the telescopic tube member in the central tube member when the telescopic tube member is extended into and out of the central tube member.

2. The extendable trailer of claim 1 wherein the centralizer includes at least one upper roller to engage an upper inside surface of the central tube member.

3. The extendable trailer of claim 2 wherein the centralizer includes at least lower roller to engage a lower inside surface of the central tube member.

4. The extendable trailer of claim 3 wherein the centralizer includes at least one first side roller to engage a first inner sidewall surface of the central tube member.

5. The extendable trailer of claim 4 wherein the centralizer includes at least one second side roller to engage a second inner sidewall surface of the central tube member.

6. The extendable trailer of claim 1 wherein the open end of the central tube member can include at least one wheel disposed in a second lateral opening in a second sidewall of the central tube member to engage a second outer sidewall of the telescopic tube member.

7. The extendable trailer of claim 5 wherein the centralizer includes a plate attached to the insertion end of the telescopic tube member.

8. The extendable trailer of claim 7 wherein the at least one upper roller and the at least one lower roller are disposed between a first flange and a second flange that extend from the plate.

9. The extendable trailer of claim 8 wherein the first side roller and the second side roller are disposed between lateral plate elements that extend from the first flange and lateral plate elements that extend from the second flange.

10. A method of transporting objects using an extendable trailer, the method comprising:
    determining a desired length of the extendable trailer, the extendable trailer comprising:
        a nose end for selectively securing the extendable trailer to a vehicle, the nose end having an extendable frame portion;
        a tail end having a primary frame to support objects to be transported on the extendable trailer;
        a central tube member supported by the primary frame, the central tube member having an inside portion, the central tube member includes an open end that receives the insertion end of the telescopic tube member, the open end of the central tube member can include at least one wheel disposed in a first lateral opening in a first sidewall of the central tube member to engage a first outer sidewall of the telescopic tube member;
        a telescopic tube member of the nose end that slidably engages the central tube member; and
        a centralizer disposed on an insertion end of the telescopic tube member that engages with the inside portion of the central tube member to help centrally position the telescopic tube member in the central tube member when the telescopic tube member is extended into and out of the central tube member;
    positioning the telescopic tube member relative to the central tube member to achieve the desired length; and
    transporting objects on the extendable trailer.

11. The method of claim 10 wherein the centralizer includes at least one upper roller to engage an upper inside surface of the central tube member.

12. The method of claim 11 wherein the centralizer includes at least lower roller to engage a lower inside surface of the central tube member.

13. The method of claim 12 wherein the centralizer includes at least one first side roller to engage a first inner sidewall surface of the central tube member.

14. The method of claim 13 wherein the centralizer includes at least one second side roller to engage a second inner sidewall surface of the central tube member.

15. The method of claim 10 wherein the open end of the central tube member can include at least one wheel disposed in a second lateral opening in a second sidewall of the central tube member to engage a second outer sidewall of the telescopic tube member.

16. The method of claim 14 wherein the centralizer includes a plate attached to the insertion end of the telescopic tube member.

17. The method of claim 16 wherein the at least one upper roller and the at least one lower roller are disposed between a first flange and a second flange that extend from the plate.

18. The method of claim 17 wherein the first side roller and the second side roller are disposed between lateral plate elements that extend from the first flange and lateral plate elements that extend from the second flange.

* * * * *